US009021707B2

(12) United States Patent
LeBlanc

(10) Patent No.: US 9,021,707 B2
(45) Date of Patent: May 5, 2015

(54) HOIST ALIGNMENT TOOL AND METHOD

(71) Applicant: Kim A. LeBlanc, Pincher Creek (CA)

(72) Inventor: Kim A. LeBlanc, Pincher Creek (CA)

( * ) Notice: Subject to any disclaimer, the term of this patent is extended or adjusted under 35 U.S.C. 154(b) by 227 days.

(21) Appl. No.: 13/683,845

(22) Filed: Nov. 21, 2012

(65) Prior Publication Data
US 2013/0152410 A1   Jun. 20, 2013

Related U.S. Application Data

(60) Provisional application No. 61/576,153, filed on Dec. 15, 2011.

(51) Int. Cl.
*G01B 11/26* (2006.01)
*G01C 15/00* (2006.01)

(52) U.S. Cl.
CPC .............. *G01B 11/26* (2013.01); *G01C 15/004* (2013.01)

(58) Field of Classification Search
USPC ............. 33/227, 228, 286, 288, 600, DIG. 21
See application file for complete search history.

(56) References Cited

U.S. PATENT DOCUMENTS

| 3,909,952 | A | * | 10/1975 | Lagasse | 33/286 |
|---|---|---|---|---|---|
| 5,644,850 | A | | 7/1997 | Costales | |
| 6,202,313 | B1 | * | 3/2001 | Yamashita | 33/286 |
| 7,441,339 | B2 | * | 10/2008 | Kallabis | 33/286 |
| 7,464,478 | B2 | * | 12/2008 | Adrian | 33/286 |
| 2001/0034944 | A1 | * | 11/2001 | Cunningham | 33/286 |
| 2004/0172836 | A1 | * | 9/2004 | Ng et al. | 33/286 |
| 2009/0000135 | A1 | * | 1/2009 | Flowers, Jr. | 33/286 |
| 2011/0097187 | A1 | | 4/2011 | Kelley et al. | |
| 2012/0297635 | A1 | * | 11/2012 | Mickow | 33/228 |

* cited by examiner

*Primary Examiner* — G. Bradley Bennett
(74) *Attorney, Agent, or Firm* — Bennett Jones LLP

(57) ABSTRACT

A hoist alignment apparatus and a method for aligning a hoist lift arm with a particular area on a frame are provided. The apparatus comprises a base defining a plane and a light operable to emit a light beam along an axis substantially orthogonal to the plane of the base, the light being held by a light holder attached to the base. The light may be replaced by an extendable rod. The hoist lift arm may be aligned by placing the apparatus on the arm and moving the arm until the light beam shines on the particular area or the tip of the extended rod points directly to the particular area.

14 Claims, 3 Drawing Sheets

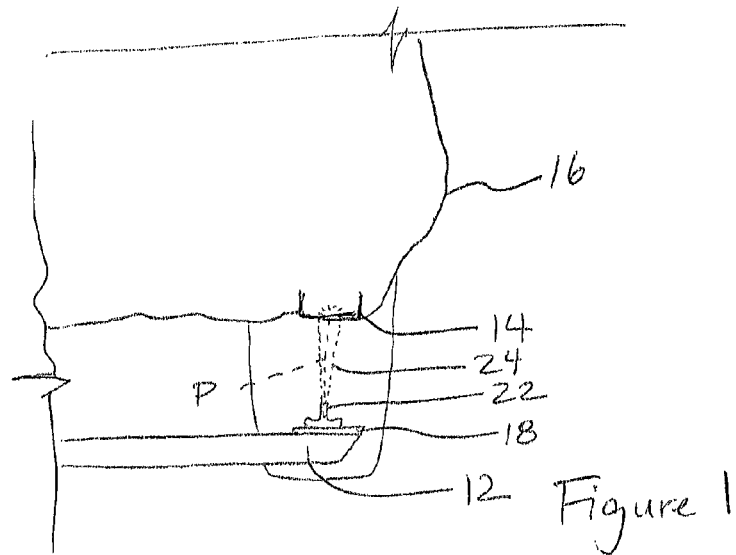
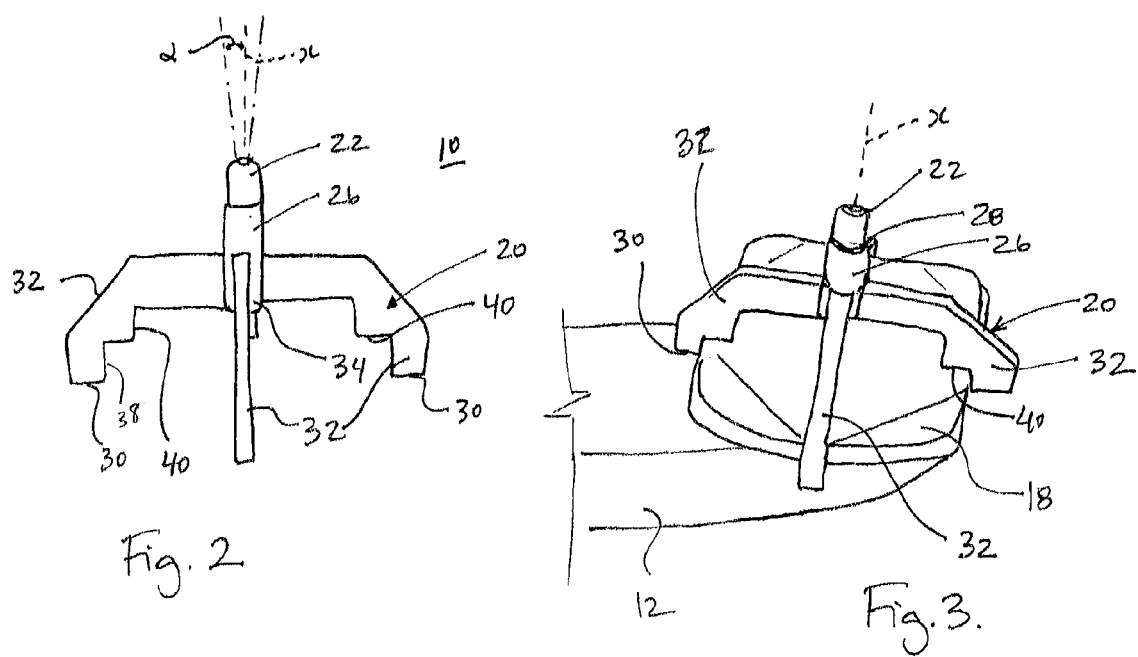

HOIST ALIGNMENT TOOL AND METHOD

FIELD

The invention relates to a method and apparatus for aligning a hoist under a vehicle.

BACKGROUND

Hoists are used in vehicle repair shops to elevate vehicles for work thereunder. Some hoists, such as two-post hoists, include arms that must be aligned under the frame such that the frame comes to bear on pads of the arms. To align the pads with the frame, an operator moves each of the arms into a position that appears correct and raises the arms until they are closer to the vehicle and then readjusts, as necessary, to ensure that the pads are properly aligned with the frame. The alignment process can be difficult and time consuming due to the number of arms to be aligned and the position of the arms relative to the operator.

SUMMARY

In accordance with a broad aspect of the present invention, there is provided a hoist alignment apparatus for aligning a hoist lift arm with a particular point on a frame, the apparatus comprising: a base defining a plane, a light operable to emit a light beam along an axis, and a light holder attached to the base and defining a light retaining area configured to hold the light in a position to emit the beam along a direction substantially orthogonal to the plane of the base.

In accordance with another broad aspect of the present invention, there is provided a method for aligning a pad of a vehicle hoist arm with a selected point on a vehicle frame, the method comprising: operating a light on the hoist arm to emit a beam of light towards the vehicle; and moving the hoist arm with the light positioned thereon until the beam of light shines on the selected area of the vehicle, indicating that the hoist arm is aligned to support the vehicle at the selected area.

In accordance with another broad aspect of the present invention, there is provided a hoist alignment apparatus for aligning a hoist lift arm with a particular point on a frame, the apparatus comprising: a base defining a plane, a rod attached to the base, the rod operable to extend along an axis substantially orthogonal to the plane of the base.

In accordance with another broad aspect of the present invention, there is provided a method for aligning a pad of a vehicle hoist arm with a selected point on a vehicle frame, the method comprising: providing an extendable rod on the hoist arm, the rod having a rod base and a tip; extending the rod towards the vehicle; and moving the hoist arm with the rod positioned thereon until the tip aligns with the selected area of the vehicle, indicating that the hoist arm is aligned to support the vehicle at the selected area.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 1 is a schematic view of a method of aligning a hoist arm under a vehicle.

FIG. 2 is a side perspective view of a hoist alignment apparatus;

FIG. 3 is a perspective view of the hoist alignment apparatus of FIG. 2 positioned in an operative position on a pad of a vehicle hoist arm;

DETAILED DESCRIPTION

Figure 4A:
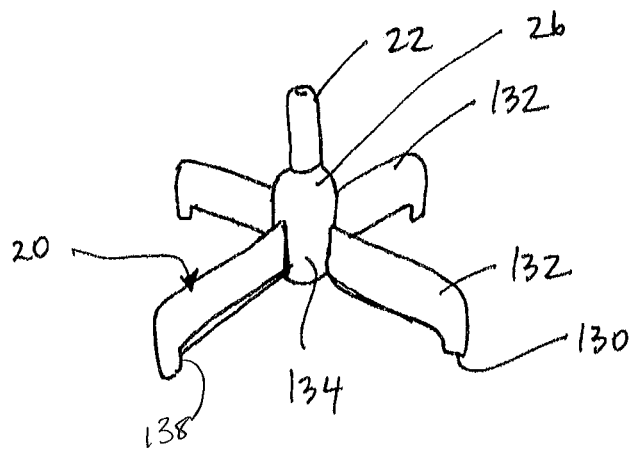
FIG. 4A is a side perspective view of a hoist alignment apparatus.

The description that follows, and the embodiments described therein, is provided by way of illustration of an example, or examples, of particular embodiments of the principles of various aspects of the present invention. These examples are provided for the purposes of explanation, and not of limitation, of those principles and of the invention in its various aspects. The drawings are not necessarily to scale and in some instances proportions may have been exaggerated in order more clearly to depict certain features. Throughout the drawings, from time to time, the same number is used to reference similar, but not necessarily identical, parts.

A method and apparatus have been invented for aligning a hoist under a vehicle.

In one embodiment, as shown in FIGS. 1 to 3, there is provided a method for aligning a hoist lift arm 12 with a selected area 14 on a vehicle 16.

As will be appreciated, a hoist may include a plurality of lift arms. Generally there are four lift arms, but the actual number may vary. A vehicle to be lifted is positioned above the hoist and the arms are elevated until the vehicle is supported thereon. Each lift arm includes a pad 18 on which the vehicle is to be supported. While the pad may extend over a great area of the upper surface of the hoist lift arm, generally each pad is three to six inches in diameter, with an upper surface shaped as a square, rectangle or circle and is of durable construction. Since not all parts of the vehicle are capable of supporting the weight of the vehicle, the pads must be positioned to come to bear against selected area 14 on the vehicle, such as its frame. The hoist arms are extended/retracted and/or pivoted to ensure the pads are properly positioned relative to the vehicle frame.

In an embodiment of a method according to the present invention, a vehicle hoist arm may be aligned with a selected point on a vehicle. The method includes: operating a light 22 on the hoist arm to emit a beam of light 24 towards the vehicle; and moving the hoist arm with the light positioned thereon until the beam of light shines on the selected area of the vehicle, indicating that the hoist arm is aligned to support the vehicle at the selected area.

The selected area on the vehicle may be the vehicle's frame and possibly a selected area on the vehicle's frame. In one example embodiment, a pad 18 of a vehicle hoist arm may be aligned with a selected area on the vehicle, such as the vehicle's frame and possibly a selected area on the vehicle's frame. The method may include: positioning a light 22 on pad 18 of the hoist arm and operating the light to emit a beam of light 24 along a substantially vertical path P; and moving pad 18 with the light positioned thereon until the beam of light shines on the selected area of the vehicle.

In this embodiment, because the beam of light is shining substantially vertically upwardly from the pad, the operator can be assured that the pad is properly positioned such that if the hoist arm, and therefore the pad, is elevated straight up, as is the usual operation of a hoist, the pad will come to rest against the frame at the point illuminated by the beam of light. The light may not be required after the alignment process and once the pads are aligned, the light beam illumination may be discontinued as by turning off the light and/or removing the light from the pad. The hoist arm position may be locked before discontinuing the light beam illumination.

The process may be repeated for all the pads of the hoist.

The light can take various forms. For example, the light could be installed directly in the pad in a way that does not interfere with the operation of the pad to support the vehicle. In another embodiment, the light may be provided by a hoist alignment apparatus 10 for aligning a hoist lift arm 12 with a selected area 14 on a vehicle frame 16.

Apparatus 10 in this embodiment, may include a base 20 defining a plane, a light 22 operable to emit a light beam 24 along an axis x, and a light holder 26 attached to the base and defining a light retaining area 28 configured to hold the light in a position to emit beam 24 along a path P having a direction substantially orthogonal to the plane of base 20.

Base 20 may be formed to allow the apparatus to be supported on the pad of a hoist arm. Base 20 may therefore include feet 30 on legs or a plate that permits the apparatus to be supported in a predictable, upright position. Base 20 also supports attachment of light holder 26. In one embodiment, the base supports the light holder in a substantially central location relative to the outer edges of the base. In the illustrated embodiment, for example, the base includes a plurality of feet 30 on legs 32 extending out from a substantially central hub 34. The base defines a plane passing through all the feet, which plane will be substantially parallel to the surface, such as the upper surface of pad 18, on which the base is supported. In one embodiment, legs 32 are rigidly fixed to hub 34 or formed together as one piece with hub 34, such that the legs cannot move relative to hub 34. In another embodiment, legs 32 are pivotably attached to hub 34 such that the legs can pivot radially about a lengthwise central axis of hub 34. Base 20 may include a magnet for attaching the base to metals that are attracted to magnets, of which the hoist and/or pad may consist.

Light holder 26 is attached to the base and defines a light retaining area 28 configured to hold the light in a position to emit beam 24 with its axis x extending along a path P having a direction substantially orthogonal to the plane of base 20. Light holder 26 can be formed as a part of the hub, for example, with area 28 opening on a top side of the hub, opposite the location of feet 30. Light holder 26 can be formed to releasably or permanently hold light 22. Area 28 may be a hole in the material of the holder into which light may be installed such as by electrical connection, welding, placing, snapping, screwing, fastening, etc.

Figure 5:
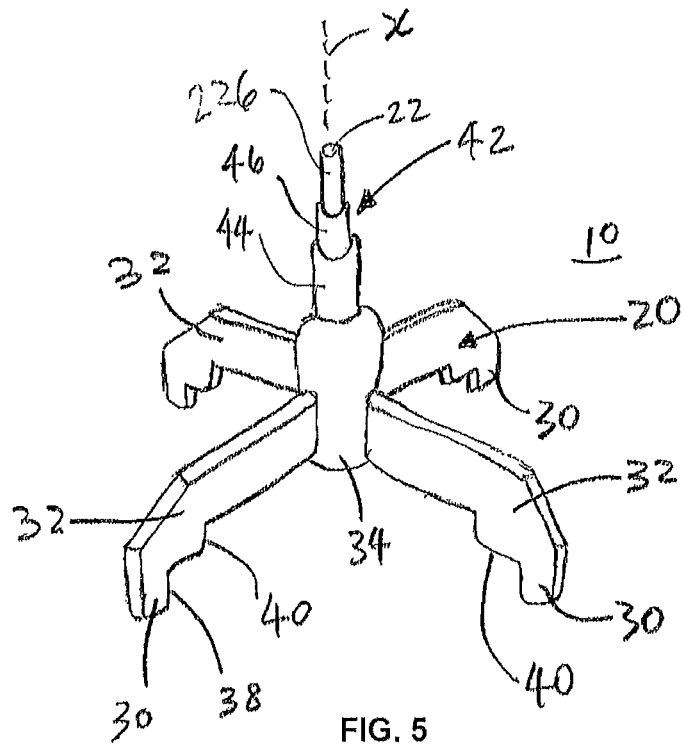
FIG. 5 is a side perspective view of a hoist alignment apparatus.

In another embodiment, as shown in FIG. 5, a light holder 226 is connected to hub 34 by an extendable and retractable rod 42. Rod 42 is releasably or permanently held by hub 34 and the central axis of hub 34 may be substantially aligned with that of rod 42. The base of rod 42 may be installed in hub 34 such as by electrical connection, welding, placing, snapping, screwing, fastening, etc. In one embodiment, light holder 226 is installed at a top end of rod 42 and rod 42 is extendable and retractable along axis x, which is substantially orthogonal to the plane of base 20. Light 22 may be installed in light holder 226 as described above. Alternatively, an area, such as a hole, may be provided in member 46 to permanently or releasably hold light 22 at the top end thereof. Light 22 may be installed in member 46 such as by electrical connection, welding, placing, snapping, screwing, fastening, etc. Rod 42 may be extended to reduce the distance between light 22 and selected area 14, which may facilitate the alignment process. Rod 42 may be retracted during any movement of the lift arm, so that the rod does not interfere with the operation of the hoist, and during storage when apparatus 10 is not in use. In one embodiment, for example, rod 42 includes a telescoping section comprising telescoping parts such as a tube 44 with an inner bore and an inner member 46 installed in the inner bore and member 46 being slideable in and out relative to the tube to permit retraction and extension of rod 42. The telescoping parts may include multiple nested tubes. The extension and/or retraction of rod 42 may he done manually or electronically. The telescoping sections in rod 42 may include markings to show distances.

Referring to FIGS. 1 to 5, light 22 can be removable or permanently fixed to light holder 26 or 226, as desired. Generally, light 22 may have a switch such that it can be turned off and on. Light 22 may be selected to generate a concentrated and/or collimated, as opposed to a diffuse, light beam 24. For example, light 22 may be configured to emit light concentrated into a beam having an angle $\alpha$ of less than 20° off axis x and possibly less than 5° off axis x. In one embodiment, for example, light 22 is a laser-type device that generates a visible illuminated area on a surface. The light can have various parameters: it can be colored or white; it can be shaped, as in the shape of an X, etc. In one embodiment, the light includes for example a laser-type light emitting device, such as a laser pointer, and a light-emitting diode (LED).

To most reliably align the pad with a selected area on a vehicle, the light can be emitted generally vertically, which is the direction that most hoists move when moving up to support a vehicle. Also, a more reliable operation is provided by positioning the light generally centrally relative to the outer edges of the pad. Base 20 may therefore be formed to facilitate installation of the light to emit vertically and from a central location on the base. In one embodiment, such as that shown in FIGS. 1 to 3, the base includes an underside formed generally concavely such that an edge of the base extends down over the edges of the pad. For example, feet 30 can each extend out from the base such that they can be placed down over the edges of the pad. For example, as shown, each foot 30 can be positioned on an extension 38 extending laterally out beyond the thickness of the leg on which it is positioned in a direction away from area 28. Extensions 38 provide that the foot can extend beyond the upper surface, while leg 32 is supported on upper surface. In one embodiment, legs 32 each include a stepped 40 or tapering shape extending toward foot 30 to provide for ease of centering and leveling on pads of various sizes.

Figure 4B:
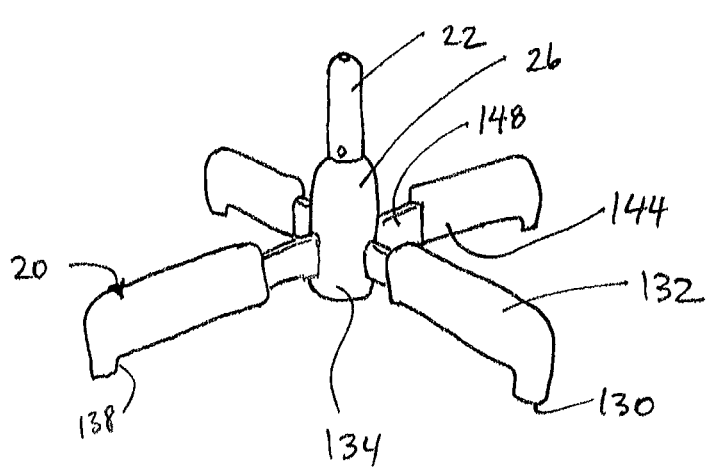
FIG. 4B is the hoist alignment apparatus of FIG. 4A expanded for insertion on a wider pad.

In another embodiment, as shown in FIGS. 4A and 4B, base includes extendable legs 132 such that the length of each leg can be selected to ensure that the legs each extend out to, and possibly over, the edges of the pad. In one embodiment, for example, each leg includes a telescoping section between hub 134 and foot 130. The telescoping section includes telescoping parts such as a tube 144 with an inner bore and an inner member 148 installed in the inner bore and slideable in and out relative to the tube to permit shortening and lengthening of the leg. The telescoping section may include markings to show set sizes and/or may include restrictions to urge the telescoping parts into preselected telescoped positions.

Each leg 130 may include an extension 138 laterally on which foot 130 is positioned and the extension may be placed over the edge of the pad to prevent sideways slippage of the apparatus off the pad during use.

In another embodiment of a method according to the present invention, the vehicle hoist arm may be aligned with the selected area on the vehicle and the method includes: providing an extendable and retractable rod on the hoist arm; extending the rod substantially vertically towards the vehicle; and moving the hoist arm with the rod positioned thereon until the rod is aligned with the selected area of the vehicle, indicating that the hoist arm is aligned to support the vehicle at the selected area.

Figure 6:
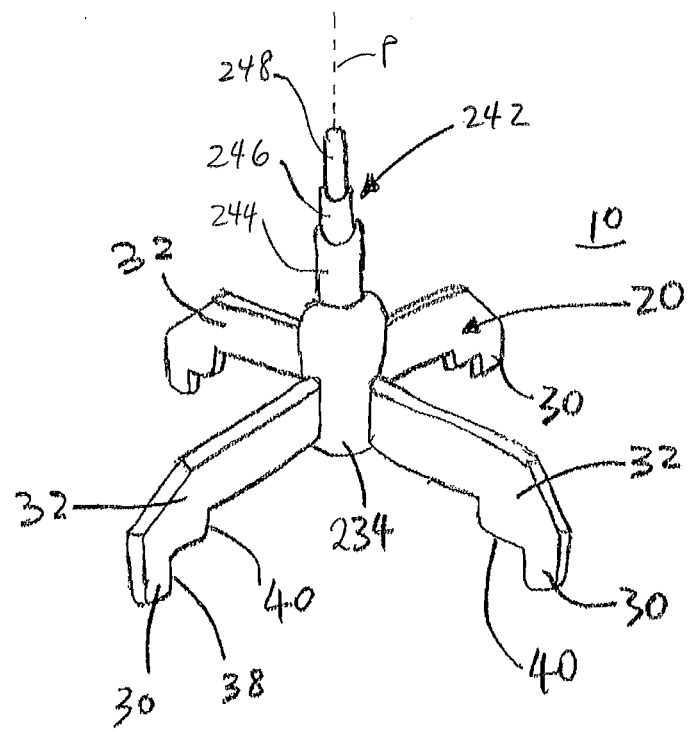
FIG. 6 is a side perspective view of a hoist alignment apparatus.

In one example embodiment, with reference to FIG. 6, the method may include: positioning an extendable and retractable rod 242 on the pad of the hoist arm and operating the rod to extend along a substantially vertical path P; and moving the pad with the rod positioned thereon until the tip of the rod points directly at the selected area of the vehicle.

In this embodiment, because the rod extends substantially vertically upwardly from the pad, the operator can be assured that the pad is properly positioned such that if the hoist arm, and therefore the pad, is elevated straight up, as is the usual operation of a hoist, the pad will come to rest against the frame at the point pointed to by the tip of the rod. The rod is not required after the alignment process and once the pads are aligned, the rod may be retracted and/or removed from the pad. The hoist arm position may be locked before the rod is retracted or removed.

The process may be repeated for all the pads of the hoist.

In one embodiment, the extendable and retractable rod may be installed directly in the pad in a way that does not interfere with the operation of the pad to support the vehicle. In another embodiment, as shown in FIG. 6, the rod may be provided by hoist alignment apparatus 10. Rod 242 may be releasably or permanently held by a hub 234 and the central axis of hub 234 may be substantially aligned with that of rod 242. In one embodiment, rod 242 is extendable and retractable along the path P, which is substantially orthogonal to the plane of base 20. The base 244 of rod 242 may be installed in hub 234 such as by electrical connection, welding, placing, snapping, screwing, fastening, etc. Rod 242 is extendable to bring its tip 248 closer to the selected area, which may facilitate the alignment process. Rod 242 may be retracted during any movement of the lift arm, so that the rod does not interfere with the operation of the hoist, and during storage when apparatus 10 is not in use.

In one embodiment, for example, rod 242 includes a telescoping section comprising telescoping parts such as base 244 which is a tube with an inner bore and an inner member 246 installed in the inner bore and member 246 being slideable in and out relative to base 244. Member 246 is also a tube with an inner bore, and tip 248 is installed in the inner bore and is slideable in and out relative to member 246. The relative sliding movement of member 246 and tip 248 permits retraction and extension of rod 242. The telescoping parts may include multiple nested tubes. In another embodiment, hub 234 is integrated with rod 242. For example, hub 234 may be the base tube of rod 242. The extension and/or retraction of rod 242 may be done manually or electronically. In a further embodiment, a spring is included in rod 242 for facilitating the extension thereof. The telescoping sections in rod 242 may include markings to show distances.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for aligning a pad of a vehicle hoist arm with a selected point on a vehicle frame, the method comprising: operating a light on the hoist arm to emit a beam of light towards the vehicle; and moving the hoist arm with the light positioned thereon until the beam of light shines on the selected area of the vehicle, indicating that the hoist arm is aligned to support the vehicle at the selected area.

2. The method of claim 1 wherein the beam of light shines along a substantially vertical upward path, the method further comprising positioning the light on the pad and moving the pad until the beam of light shines on the selected area.

3. The method of claim 1 further comprising removing the light from the hoist arm.

4. The method of claim 1 further comprising locking the hoist arm in an aligned position.

5. The method of claim 1 wherein the light is held on a base having an edge, the method further comprising extending the edge of the base down over the edges of the pad.

6. A hoist alignment apparatus for aligning a hoist lift arm with a particular point on a frame, the apparatus comprising: a base defining a plane, a rod attached to the base, the rod operable to extend along an axis substantially orthogonal to the plane of the base.

7. The apparatus of claim 6 wherein the rod comprises telescoping parts.

8. The apparatus of claim 6 wherein the rod is retractable.

9. The apparatus of claim 6 wherein the base comprises a plurality of feet, the plurality of feet is each supported on a leg, the base further comprises a hub from which the leg extends outwardly, and the hub is formed as part of the rod.

10. A method for aligning a pad of a vehicle hoist arm with a selected point on a vehicle frame, the method comprising: providing an extendable rod on the hoist arm, the rod having a rod base and a tip; extending the rod towards the vehicle; and moving the hoist arm with the rod positioned thereon until the tip aligns with the selected area of the vehicle, indicating that the hoist arm is aligned to support the vehicle at the selected area.

11. The method of claim 10 wherein the rod extends along a substantially vertical upward path, the method further comprising positioning the rod on the pad and moving the pad until the tip points directly to the selected area.

12. The method of claim 10 wherein the rod is retractable, the method further comprising retracting the rod.

13. The method of claim 10 further comprising removing the rod from the hoist arm.

14. The method of claim 10 wherein the rod comprises telescoping parts.

* * * * *